(No Model.)
J. W. WHIPP.
WHEEL SCRAPER.
No. 303,476. Patented Aug. 12, 1884.
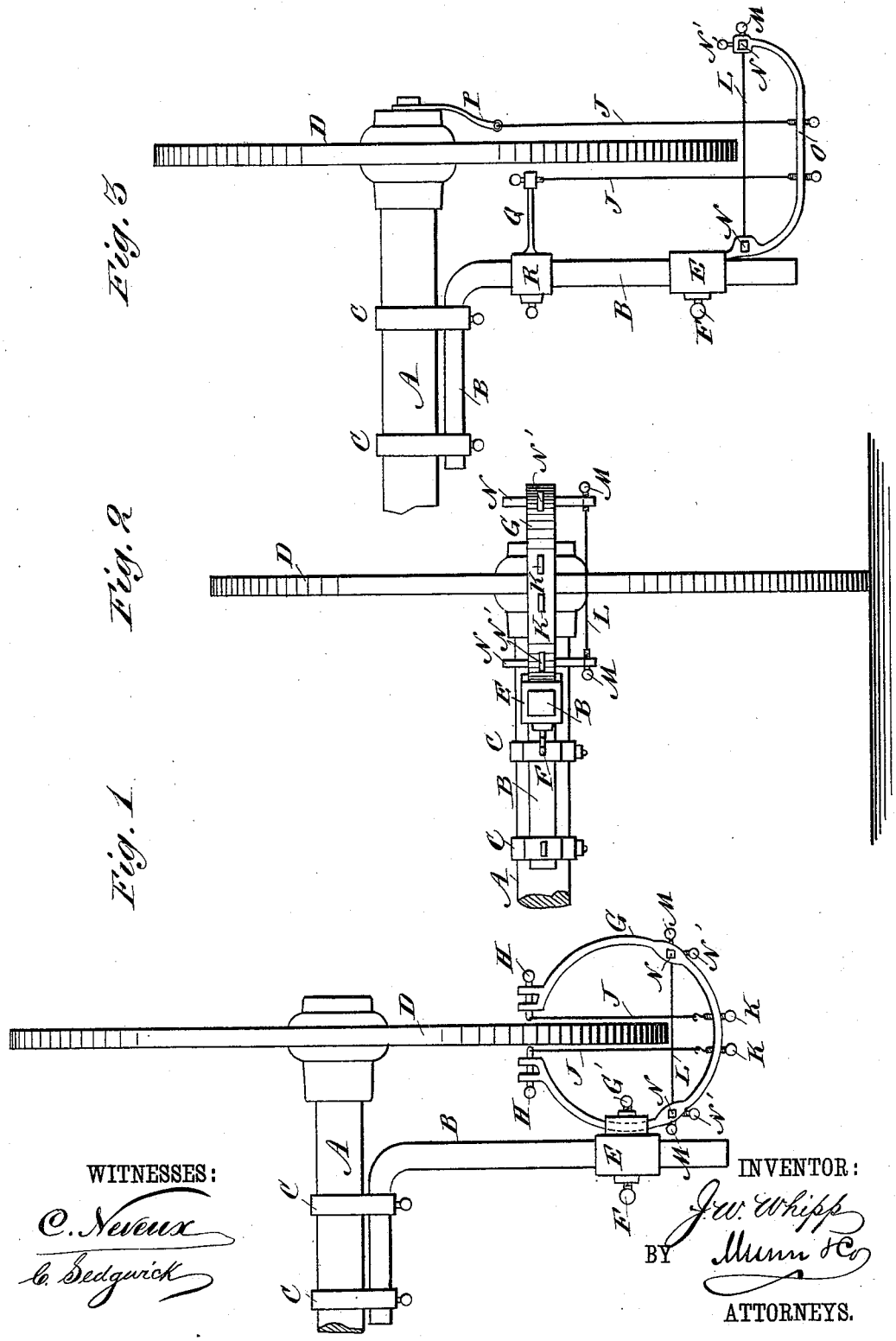
WITNESSES:
C. Neveux
C. Sedgwick
INVENTOR:
J. W. Whipp
BY Munn & Co
ATTORNEYS.

UNITED STATES PATENT OFFICE.

JOHN W. WHIPP, OF VAN ALSTYNE, TEXAS, ASSIGNOR TO HIMSELF AND JOHN W. PATTIE, OF SAME PLACE.

WHEEL-SCRAPER.

SPECIFICATION forming part of Letters Patent No. 303,476, dated August 12, 1884.

Application filed April 10, 1884. (No model.)

*To all whom it may concern:*

Be it known that I, JOHN W. WHIPP, of Van Alstyne, Grayson county, Texas, have invented a new and Improved Wheel-Scraper, of which the following is a full, clear, and exact description.

The object of my invention is to provide a new and improved device for scraping mud and adhesive soil from the outer edges and sides of the fellies of vehicle-wheels to prevent an accumulation of mud or adhesive soil on the wheel rim or felly and between the spokes.

The invention consists in a frame adapted to partly embrace the wheel and carrying longitudinal and transverse scraping-wires, which wires are provided with means for adjusting their tension, and the transverse wire is provided with means for adjusting it vertically. The frame is held adjustably on an arm or bar on the axle.

Reference is to be had to the accompanying drawings, forming part of this specification, in which similar letters of reference indicate corresponding parts in all the figures.

Figure 1 is a plan view of my improved wheel-scraper, showing it applied on the axle of a vehicle. Fig. 2 is a rear end view of the same, and Fig. 3 is a plan view of a modification of the same.

On the axle A an angularly-bent bar, B, is held by clips C in such a manner that part of the said bar extends horizontally toward the rear of the vehicle at the side of the wheel D. On the said bar B a sliding box or sleeve, E, is mounted, which is provided with a binding-screw, F, for locking it in place on the said bar. A circular curved frame, G, is held horizontally on the box C in such a manner that it surrounds the rim of the wheel, the closed end of the frame being at the rear of the rim of the wheel, and the free ends of the frame being at opposite sides of the wheel. The frame G passes through an apertured jaw of the box E, and can be locked in place in the same by a binding-screw, G'. In the ends of the frame G two screws or pintles, H, are held, which project toward the sides of the wheel, and on the inner ends of the said pintles or screws H wires J are fastened, which have their opposite ends secured to the inner ends of the screws K, screwed through the frame G from the outside to the inside, the wires J being thus held parallel with the sides of the wheel. The front end of the wires J can be adjusted a greater or less distance from the sides of the wheel by means of the screws or pintles H, and the said wires can be drawn taut by means of the screws K. A transverse wire, L, extends across the frame G adjoining to and behind the outer surface of the rim of the wheel, the ends of the said wire L being held to screw M, passed through the lower ends of bars N, held to slide vertically in the frame G, which bars can be locked in place at any desired suitable elevation by means of binding-screws N'. The side wires, J, scrape the mud, soil, &c., from the sides of the rim or felly of the wheel, and the wire L scrapes it from the edge surface of the felly or rim.

As the scrapers are formed of wire the mud and soil scraped from the wheel cannot accumulate on the scrapers.

In place of the circularly-bent frame G a U-shaped frame, O, can be used, as shown in Fig. 3, the transverse wire L being arranged in the same manner as shown in Figs. 1 and 2; but the longitudinal or side wires, J, have their front ends secured to an arm, P, on the axle, an arm, Q, projecting from a box, R, held adjustably on the bar B. As the bar B is held adjustably or detachably on the axle, and as the frame G is held adjustably on the bar, the said frame can be easily removed and attached to another vehicle.

Having thus described my invention, I claim as new and desire to secure by Letters Patent—

1. A wheel-scraper made substantially as herein shown and described, and consisting of a frame adapted to embrace the wheel, and provided with wires held parallel with and transversely to the wheel, substantially as herein shown and described.

2. In a wheel-scraper, the combination, with a frame adapted to embrace part of the wheel, of wires held on the said frame parallel with and transversely to the said wheel, and of means for adjusting the tension of said wires, substantially as herein shown and described.

3. In a wheel-scraper, the combination, with a frame adapted to embrace part of the wheel, of wires held on the said frame parallel with and transversely to the wheel, and of means for adjusting the transverse wires vertically, substantially as herein shown and described.

4. In a wheel-scraper, the combination, with a frame adapted to partly embrace the wheel, of the longitudinal wires J, the screws K, to which wires J are fastened, the transverse wire L, the screws M, the upright sliding bars N, and the binding-screws N', substantially as herein shown and described.

5. The combination, with the axle A and wheel D, of the angularly-bent arm B, held on the axle, and a frame held on the arm B, and carrying scraping-wires, substantially as herein shown and described.

6. The combination, with the axle A and wheel D, of the angularly-bent arm B, held on the axle, of the sliding box E on the arm, and a frame held on the said box, and carrying scraping-wires, substantially as herein shown and described.

JOHN W. WHIPP.

Witnesses:
K. D. LINDSEY,
J. T. CREAGER.